FEEDBACK CURRENT SWITCH WITH LOAD-LINE DISPLACING NETWORK

Filed Oct. 4, 1965 2 Sheets-Sheet 1

INVENTOR.
TEH-SEN JEN

BY Martin G. Reiffin
ATTORNEY 3,500,071

FEEDBACK CURRENT SWITCH WITH LOAD-LINE DISPLACING NETWORK

Teh-Sen Jen, Wappingers Falls, N.Y., assignor to International Business Machines Corporation, Armonk, N.Y., a corporation of New York Filed Oct. 4, 1965, Ser. No. 495,826
Int. Cl. H03k *17/00*
U.S. Cl. 307—254 10 Claims

ABSTRACT OF THE DISCLOSURE

A current switch having positive feedback so as to selectively present either a first or a second load line operating level to the collector terminals of the input switching transistors.

This invention relates to switching circuits for performing logic functions in digital computers and for other applications where binary switches are required.

The overall performance capability of digital computers and other systems employing switching circuits is largely dependent upon the switching speed of the individual circuits, particularly in view of the enormous number of switching operations which must be performed in any given time period or for any particular computation or data process. Therefore, the art has devoted itself to the development of circuits having the highest possible switching speed.

The so-called "current switch" disclosed in United States Patent No. 2,964,652 to H. S. Yourke, issued Dec. 13, 1960 and assigned to the assignee of the present application, has come to be well-known as significantly superior to other switching circuits with respect to both speed and stability.[1,2] Experimental comparison has shown the current switch to be about ten times as fast as its fastest rivals, the diode-logic and modified resistor-transistor-logic circuits.[3] The current switch is probably used more extensively than any other digital circuit.

Because of its importance and extensive use, since its initial publication[4] the current switch has been the subject of intensive studies by many workers in attempts to improve its speed, reliability and economy. The usual approach has been based upon the following rationale. Since the current switch changes from one state to the other when the input potential traverses the fixed reference potential, it was believed by those skilled in the art that the time for this traversal to occur could be reduced by employing positive feedback to vary a non-fixed reference potential in a direction opposite to that of the input potential swing during the switching operation, that is, toward the input potential until the traversal and away from the input potential thereafter. Because the two potentials would "meet" sooner as a result of the positive feedback, the circuit would switch faster, or so it was reasoned.

All such known prior attempts failed. The prior positive feedback arrangements resulted in a substantial loss in switching speed rather than the improvement to be expected. In view of the many futile efforts to devise circuit modifications which would improve the current switch, many workers in the art became resigned to the belief that the conventional version of the current switch is the ultimate form of this circuit in the sense that no substantial improvements is obtainable by modifying its circuitry and that only with the advent of new transistors or other active switching devices would any significant improvement be possible.

The present invention has achieved substantial improvements in speed, reliability and economy by adding to the heretofore unsuccessful positive feedback current switch only a single resistor.

This added resistor provides a novel load-line displacing network which substantially improves the switching speed. That is, in one state of the switch the latter sees an equivalent load impedance having a first load-line and in the process of switching to the other state of the switch the equivalent load impedance automatically changes to present a displaced load-line biased a predetermined potential difference from the first load-line. As a result, the input potential is required to swing smaller increments before it reaches the switching thresholds and hence the switching action commences sooner.

The added resistor further provides a negative feedback component so that the net overall feedback to the reference base is less positive, thereby resulting in greater immunity to input level deviations, reliable operation with less expensive components having larger specification tolerances, and the capability of operation with only a single power supply.

It is therefore a primary object of the present invention to provide a novel binary switch having a load-line displacing network to improve the switching speed.

A further object is to improve the speed, reliability and economy of the positive feedback current switch circuit by the addition thereto of a single resistor to superpose a negative feedback component on the reference potential at the reference base.

Still another object is closely related to the negative feedback aspect of the present invention. That is, circuits embodying the negative feedback are more economical in that they do not require tight component specifications and hence may utilize relatively less expensive transistors or other active devices, passive elements and power supplies. For a given set of component tolerances the negative feedback reduces the range of variation of the signal swing amplitudes at the outputs of the circuit.

Another object is to provide a novel current switch which requires only one power supply, as opposed to prior current switch circuits which generally require at least two power supplies.

A further object, again achieved by virtue of the negative feedback, is to provide a switching circuit having greater stability with respect to quiescent direct current levels. Any tendency of a direct current level to vary due to an input level variation or to a component parameter deviation is counteracted by the negative feedback component.

Still another object is to eliminate the reference base lead inductance that is inherent in the conventional current switch when embodied in the form of a monolithic integrated circuit. This elimination of base lead inductance further improves the high frequency stability.

A further object is to provide a novel switching circuit wherein the rise time of the output is less dependent on the rise time of the input signal. If the rise time of the input signal is sufficiently slow it is even possible to provide a negative propagation delay. That is, the output signal will reach its midpoint before the input signal reaches its midpoint.

Although the subject invention is disclosed for purposes of illustration as embodied in a transistor current switch, it is readily embodied in any other form of switching circuit which is switched in response to the traversal of input and reference potentials, and irrespective of whether

[1] Rigby, G. A., "High-Speed Emitter-Current Switching," Proceedings of the I.R.E.E., Australia, January 1964, 15.
[2] Rapp, A. K., Robinson, J. L., "Rapid-Transfer Principles for Transistor Switching Circuits," IRE Trans. on Circuit Theory, vol. CT–8, pp. 454–461, December 1961.
[3] Bapat, Y. N., "High Speed Computer Switching Circuits," J. Inst. Telecom. Engrs. (India), vol. 8, No. 1, 1962, pp. 50–60.
[4] Yourke, H. S., "Millimicrosecond Transistor Current Switching Circuits," IRE Trans. on Circuit Theory, vol. CT–4, pp. 236–240, September 1957.

such other form of circuit utilizes transistors or any other type of active component.

The foregoing and other objects, features and advantages of the invention will be apparent from the following, more particular description of preferred embodiments of the invention as illustrated in the accompanying drawings wherein.

Figure 4:
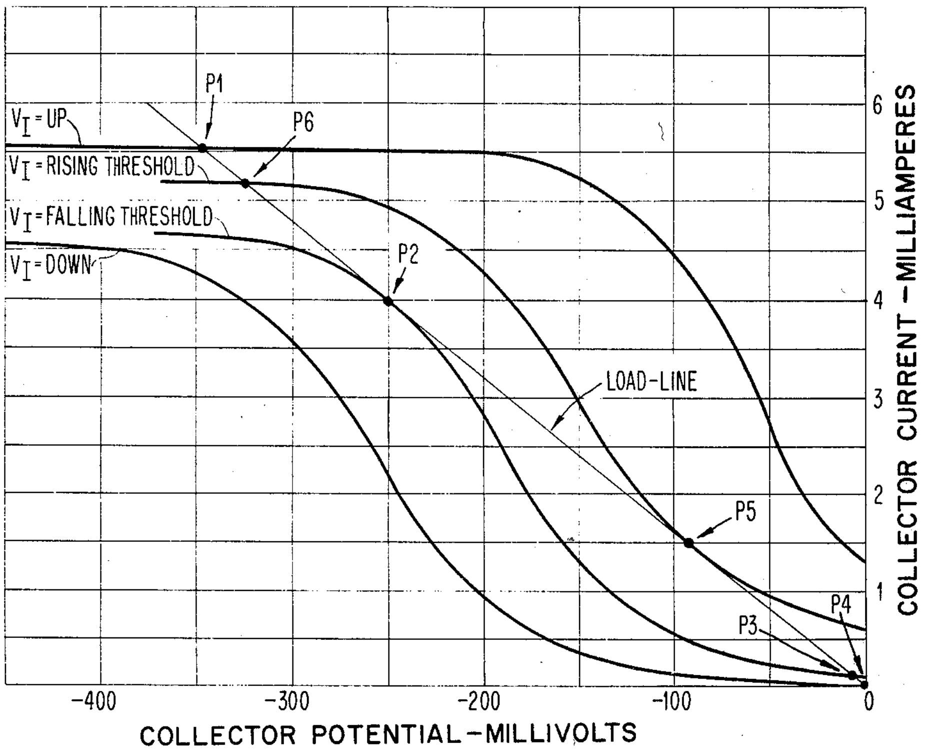
Figure 5:
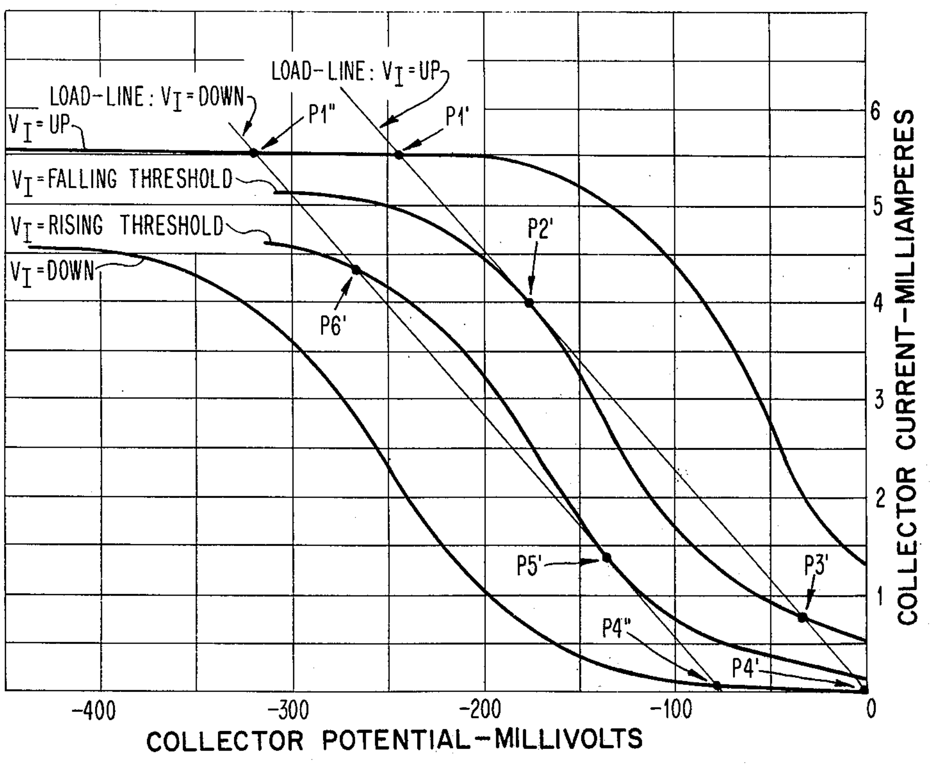

FIG. 4 illustrates the mode of operation of the conventional feedback current switch without the present invention and shows the voltage-current characteristics at the collector of the first transistor and the fixed load-line of the conventional circuit; and FIG. 5 is similar to FIG. 4 but shows the characteristics and mutually displaced load-lines obtained by adding to the conventional feedback current switch the negative feedback coupling resistor in accordance with the present invention.

Figure 1:
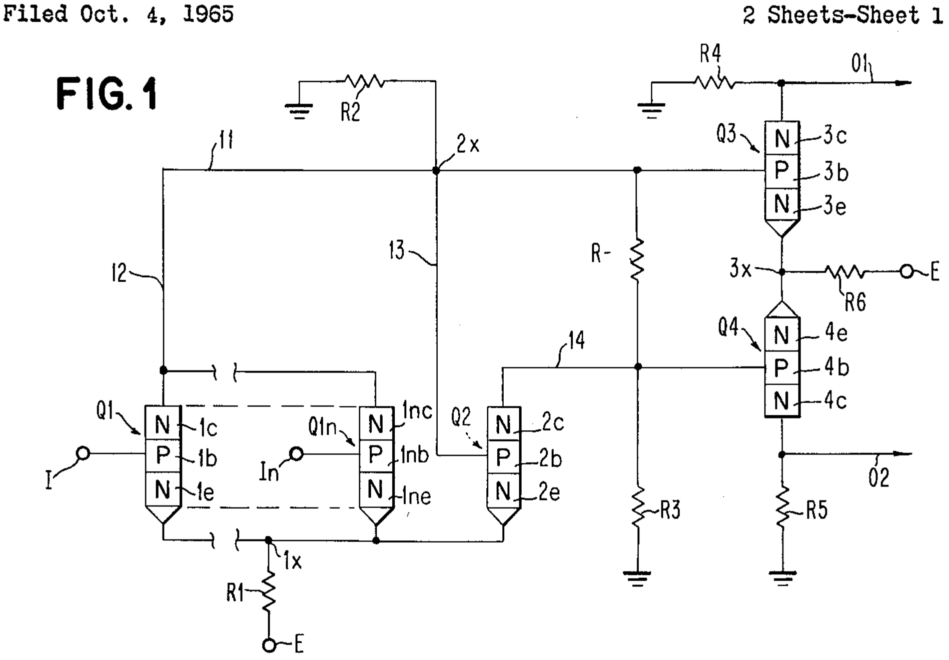
FIG. 1 is a circuit diagram showing the invention embodied in the form of a feedback current switch.

Referring now to the drawings in more detail, and first to FIG. 1 thereof, there is shown a two-stage circuit wherein the first stage comprising transistors Q1 to Q1*n* inclusive and transistor Q2 constitutes the feedback current switch and the second stage comprising transistors Q3 and Q4 functions as a differential amplifier. Transistors Q1 and Q1*n* constitute a plurality of transistors connected in parallel in the usual manner in order to provide the OR and NOR logic functions, although only two transistors are shown for simplicity in illustration.

Transistor Q1 is provided with an input 1 connected to its base 1*b* and the other paralleled transistors are similarly provided with inputs as indicated at 1*n*. The collectors 1*c*, 1*nc* of transistors Q1, Q1*n* are connected by leads 11, 12 to one end of a load resistor R2 having its other end grounded as shown. The emitters 1*e*, 1*ne* of transistors Q1, Q1*n* are connected to a node 1*x* which is in turn connected to a constant current source comprising a power supply E and a resistor R1.

Transistor Q2 has its collector 2*c* connected to one end of load resistor R3 having its other end grounded as shown. The emitter 2*e* of transistor Q2 is connected to the constant current source at the node 1*x*. The base 2*b* of transistor Q2 is direct-coupled by leads 11, 12, 13 to the collectors 1*c*, 1*nc* of transistors Q1 to Q1*n* inclusive. The effect of this connection of the base 2*b* is to apply to the latter a reference potential which swings in opposite phase to that of the input potential at input I so as to constitute a direct-current positive feedback. The circuit as thus far described in detail constitutes the well-known feedback current switch of the prior art.

It is also known in the prior art to add in cascade with a current switch a differential amplifier similar to the arrangement of transistors Q3 and Q4. More specifically, transistor Q3 comprises a collector 3*c* connected through load resistor R4 to ground. The base 3*b* of transistor Q3 is connected by leads 11, 12 to the collector 1*c* of transistor Q1. The emitter 3*e* of transistor Q3 is connected to a common node 3*x* which is supplied with a constant current by a current source comprising resistor R6 and power supply E. Also connected to node 3*x* is the emitter 4*e* of transistor Q4. The base 4*b* of the latter is connected by lead 14 to the collector 2*c* of transistor Q2. The collector 4*c* of transistor Q4 is connected through load resistor R5 to ground. The in-phase output O1 is derived from the collector 3*c* of transistor Q3 and the out-of-phase output O2 is taken from the collector 4*c* of transistor Q4.

As thus far described the circuitry is well-known and generally has a slower switching speed than can be obtained with a conventional current switch wherein the reference base is at a fixed reference potential instead of being provided with positive feedback as by the connections 11, 12, 13 from base 2*b* to collector 1*c* in FIG. 1. It was discovered that substantial improvements in switching speed, reliability and economy over both the conventional non-feedback current switch and the feedback current switch may be obtained by adding the single resistor R coupling the collector 1*c* of transistor Q1 and the base 2*b* of transistor Q2 to the collector 2*c* of the latter transistor through the leads 11, 12 and 14.

The mode of operation by which the mere addition of the single resistor R effects these substantial improvements will be explained in detail below. However, first the extent of the improvement in switching speed will be illustrated by reference to the oscilloscope photographs of FIGS. 2 and 3. These show traces of input potential at I and the output potential at the out-of-phase output O2 for the circuit of FIG. 1 with the resistor R omitted for the traces of FIG. 2 and included for the traces of FIG. 3. Each large division in these photographs represents two nanoseconds in the horizontal direction and 50 millivolts in the vertical direction.

The generally employed figure of merit for switching speed is the propagation delay which is the time period from the instant of time when the input signal reaches its midpoint between its two quiescent levels and the instant of time when the output signal reaches its midpoint. It will be seen in FIG. 2 that in the prior art feedback current switch the propagation delay during the fall of the input potential is about 2.1 nanoseconds whereas in FIG. 3 the propagation relay is shown as somewhat improved by the present invention to about 1.6 nanoseconds.

Figure 3:
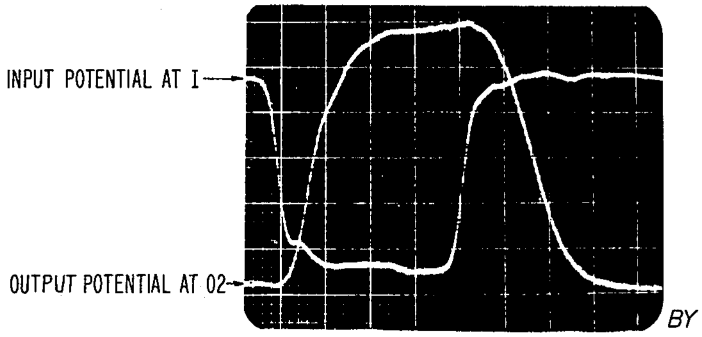
FIG. 3 is an oscilloscope photograph similar to FIG. 2 but showing the traces of the input and output signals of the circuit of FIG. 1 embodying the invention.

However, during the rise of the input potential the present invention provides a much greater improvement. In FIG. 3 it will be seen that the propagation delay of the feedback current switch in accordance with the pior art is about 7.1 nanoseconds whereas with the addition of the resistor R in accordance with the present invention the propagation delay is shown in FIG. 3 as reduced to only about 3.0 nanoseconds. As will be explained below, the improvement during the input signal rise may be traded off for greater improvement during the input signal fall so that the propagation delay is approximately equal both halves of the switching cycle.

Figure 2:
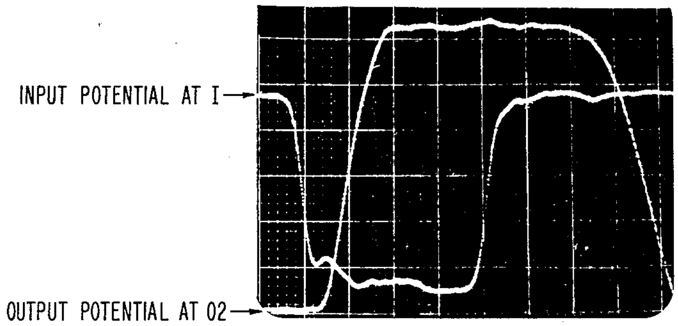
FIG. 2 is an oscilloscope photograph showing traces of the input and output signals of a conventional feedback current switch as shown in FIG. 1 but with the novel aspect of the present invention omitted therefrom.

The circuit which was utilized to obtain the oscilloscope traces displayed in FIGS. 2 and 3 was in accordance with FIG. 1 with the following resistor values in ohms:

| | | | |
|---|---|---|---|
| R: | 82 | R4: | 36 |
| R1: | 300 | R5: | 36 |
| R2: | 70 | R6: | 120 |
| R3: | 70 | | |

The power supply E provided a voltage of −2.0 volts. The transistors Q1 to Q4 inclusive were IBM Type S–101 and had the following specifications:

IBM TYPE S–101 TRANSISTOR OR TYPE 2N709

| | |
|---|---|
| Transit Time $T_e$ ($V_{bc}=O$, $I_e$=20 ma.) _____ps__ | 150 |
| Junction capacitance, collector to base $C_{cb}$ ($V_{bc}=O$) pf__ | 1.8 |
| Junction capacitance, collector to base $C_{cb}$ ($V_{bc}$= 600 mv.) ______pf__ | 4.0 |
| Junction capacitance, emitter to base $C_{ce}$ ($V_{be}=O$) pf__ | 0.9 |
| Internal base resistance $\gamma_b$ ($I_e$=0.5 ma.) __ohms__ | 90 |
| Internal collector resistance $\gamma_c$ ______do____ | 12 |
| Avalanche breakdown voltage from collector to base with emitter open circuited $BV_{cbo}$ ($I_e=1\mu a$) volts__ | 25 |
| Avalanche breakdown voltage from emitter to base with collector open circuited $BV_{ebo}$ ($I_e=1a$) volts__ | 5 |

IBM Type S–101 TRANSISTOR OR TYPE 2N709—Continued

| | |
|---|---|
| Beta B ($I_e$=15 ma.) | 30 |
| Base to collector voltage $V_{bc}$ ($I_e$=15 ma., $I_c$=14 ma.) mv | 700 |

The mode of operation of the current switch stage Q1, Q2 with resistor R omitted will now be described with reference to FIG. 4. The latter shows a series of collector voltage-current characteristics as seen looking into the first stage Q1, Q2 at the node 2*x* with the potential at the input I as the varying parameter. That is, each of the curves shows the variation in collector voltage and collector current of transistor Q1 with a given fixed potential at the input I, each of the curves representing a different input potential.

More specifically, the curve designated "$V_I$=*UP*" corresponds to the input potential at its uppermost level; the curve "$V_I$=RISING THRESHOLD" corresponds to the input potential at the switching threshold when the input signal is rising; the curve "$V_I$=FALLING THRESHOLD" corresponds to the input potential at the switching threshold when the input signal is falling; and the curve "$V_I$=DOWN" corresponds to the input potential at its lowermost level.

Still assuming that the resistor R is omitted, the load on the collector 1*c* of transistor Q1 is determined by load resistor R2 and remains substantially fixed for both rising and falling inputs, as shown by the load-line in FIG. 4. Assuming that the input potential at input I is initially at its uppermost level, transistor Q1 will be at the operating point designated P1 at the intersection of the load-line and the characteristic curve designated "$V_1$=UP." Now let it be assumed that the potential at input I falls. The operating point will then move downwardly along the load-line from the point P1 to the point designated P2 at which the load-line is tangent to the knee of the curve designated "$V_1$=FALLING THRESHOLD." Any further lowering of the input potential will cause the operating point to move almost instantly to the point P3 at which transistor Q1 is almost entirely cut off. As the input potential finally approaches the lowermost level of the operating point will eventually reach the quiescent point designated P4 at the intersection of the load-line and the curve designated "$V_1$=DOWN."

As the input potential rises the operating point will travel along the load-line from the quiescent point P4 to the point designated P5 at which the load-line is tangent to the lower knee of the curve designated "$V_1$=RISING THRESHOLD." This constitutes the switching threshold and any further rise in the input potential will cause the operating point to move almost instantly upwardly along the load-line to the point designated P6. When the input potential finally reaches the uppermost level the operating point will again return to the quiescent point designated P1 at the intersection of the load-line and the curve designated "$V_1$=UP."

Referring now to FIG. 5 there is shown the mode of operation of the present invention with the resistor R included in the circuit shown in FIG. 1. It will be seen that in this case there are two different respective load-lines for the states when the input potential is "up" and when it is "down." When the input potential is "up," transistor Q2 is "off" and the load-line is the Thevenin equivalent of resistor R2 in parallel with the series combination of resistors R and R3. However, when the input potential is "down," transistor Q2 conducts so that the load-line has the same magnitude as the case when the input potential is "up" but is now biased to a Thevenin equivalent voltage:

$$V_{TH} = -\frac{I_{cz} \cdot R3 \cdot R2}{R + R3 + R2}$$

where $I_{cz}$ is the collector current of transistor Q2.

This bias condition causes the load-line for the "down" input potential to be displaced to the left as shown in FIG. 5. As a result the switching thresholds are changed so that in FIG. 5 the curve designated "$V_I$=FALLING THRESHOLD" is now above the curve designated "$V_I$=RISING THRESHOLD," rather than therebelow as shown in FIG. 4.

The circuit in accordance with the present invention and embodying the resistor R operates in the following manner. Assuming that the input potential is at its upper quiescent level, the operation point will be at the intersection P1′ of both the load-line and characteristic curve which are designated "$V_I$=UP." As the input potential falls the operating point will move from P1′ to the switching threshold at P2′ where the load-line is tangent to the knee of the curve designated "$V_I$=FALLING THRESHOLD." Any further lowering of the input potential will cause the operating point to move almost instantly from P2′ to P3′.

As the input potential falls still lower the operating point would eventually reach the point P4′ if it were not for the fact that when the input potential is down, the load-line is displaced to the left to the new biased position designated "$V_I$=DOWN." Hence the quiescent point when the input potential is at its lowermost level will be at the intersection of this load-line with the characteristic curve designated "$V_I$=DOWN," this intersection being designated P4″. It will be understood that this explanation has been simplified in that as the input potential falls the load-line simultaneouly shifts from the initial position to the biased position. Hence the operating point will not actually move in a rectilinear path along the respective load-line but will instead move in a somewhat curvilinear path in the direction in which the load-line is being displaced.

In a similar manner, as the input potential rises the operating point will travel up the biased load-line designated "$V_I$=DOWN" from the quiescent point P4″ until it reaches the switching threshold at the point P5′ where said load-line is tangent to the knee of the curve designated "$V_I$=RISING THRESHOLD." The operating point will then switch almost instantly to the point designated P6′. When the input potential is finally at its uppermost level the operating point would be at P1″ if it were not for the fact that the load-line has simultaneously shifted to its original unbiased position designated "$V_I$=UP." Hence when the input potential is at its uppermost level, the operating point will again be at the quiescent point designated P1′.

Comparing the operation for the conventional feedback current switch as illustrated in FIG. 4 with that for the present invention as illustrated in FIG. 5, it will be seen that in the latter case the switching thresholds are closer to the respective quiescent levels of the input potentials so that switching commences sooner and thereby increasing the switching speed. Furthermore, the geometrical relationship of the load-lines and characteristic curves in FIG. 5 is such that the switching speed is maximized during the fall of the input potential by minimizing the load resistor value to increase the slope of the load-line, and when the input potential is rising by increasing the Thevenin equivalent bias voltage so as to displace the load-line "$V_I$=DOWN" in a direction farther to the left of the origin. However, by so maximizing the switching speed the amplitude of the signal swing of the output of the first stage is reduced to such an extent that unity gain cannot be achieved. This limitation is obviated by the differential amplifier of the second stage Q3, Q4.

The latter provides further advantages including improved driving capabilities due to the additional stage of gain and the fact that it isolates the output from the feedback point and the input. As a result the circuit can be readily designed to drive low impedance lines and it has a high power fan-out.

As noted above, in the absence of "trade-off" the improvement in switching speed during the input potential fall is relatively moderate and arises due to the somewhat reduced magnitude of the load-line formed by placing resistors R and R3 in parallel with collector load resistor R2. However, during the input potential rise the improvement in switching speed is radical, as shown in FIG. 3 compared with FIG. 2, and is due to the displacement of the load-line to the biased position by the amount of the Thevenin equivalent voltage when transistor Q2 is "on."

The switching speed improvement during the rise and fall times of the input potential may be approximately equalized by trading off or sacrificing some improvement during the input potential rise for more radical improvement during the input potential fall. This is achieved by reducing the magnitude of the load-lines so as to increase their slope which, as may be seen from the geometry of the characteristic curves in FIG. 5, will raise the switching thresholds for both the rising and falling cases whereby the falling threshold will be reached sooner and the rising threshold will be reached later than for the circuit parameters displayed in FIG. 3.

While the invention has been particularly shown and described with reference to the preferred embodiment thereof, it will be understood by those skilled in the art that the foregoing and other changes in form and details may be made therein without departing from the spirit and scope of the invention.

I claim:

1. A switch comprising an input node adapted to receive a binary signal having either of two quiescent levels, a source of current, a pair of switching elements, means connecting said node, source and elements to switch said current to one of said switching elements in response to one of said input levels and to the other of said switching elements in response to the other of said input levels, a potential supply, load impedance means connecting said potential supply and one of said switching elements to pass said current between said supply and said one element, said load impedance means presenting to said one switching element a first load-line in response to said one input level and a second load-line in response to said other input level, said first load-line being displaced a predetermined potential difference from said second load-line.

2. A switch comprising an input node adapted to receive a binary signal having either of two quiescent levels, a source of current, a pair of switching elements, means connecting said node, source and elements to switch said current to one of said switching elements in response to one of said input levels and to the other of said switching elements in response to the other of said input levels, a potential supply, resistive load impedance means connecting said potential supply and one of said switching elements to pass said current between said supply and said one element, said load impedance means and said potential supply presenting to said one switching element a circuit having a first Thevenin equivalent voltage in response to said one input level and a second Thevenin equivalent voltage in response to said other input level.

3. A switch comprising an input node adapted to receive a binary signal having either of two quiescent levels, a source of current, a pair of switching elements, means connecting said node, source and elements to switch said current to one of said switching elements in response to one of said input levels and to the other of said switching elements in response to the other of said input levels, a potential supply, a pair of load impedance means, each connecting said potential supply and a respective one of said switching elements to pass said current between said supply and said elements, and a third impedance means mutually connecting said two load impedance means to present to at least one of said switching elements a variable load-line which is a function of the current flow through said elements.

4. A feedback current switch comprising a pair of transistors each having a base, a collector and an emitter, an input node connected to the base of a first of said transistors, a constant current source connected to the emitters of both transistors, a potential supply, a first pair of load impedances each connected between a collector of a respective one of the transistors and said potential supply, conductive means connecting the collector of said first transistor to the base of the second transistor, and second impedance means mutually connecting the collectors.

5. A current switch comprising an input node adapted to receive a binary signal having either of two quiescent levels, a source of constant current, a switching device having two current paths and switchable to a first state to pass said current through one of said paths in response to one of said input levels and switchable to a second state to pass said current through the other of said paths in response to the other of said input levels, a potential supply, and load impedance means connecting said potential supply and said switching device to pass said current between said potential supply and said device, said load impedance means presenting to said switching device a first load-line in said first state thereof and a second load-line in said second state thereof, said first load-line being displaced a predetermined potential difference from said second load-line.

6. A current switch comprising an input node adapted to receive a binary signal having either of two quiescent levels, a source of constant current, a switching device having two current paths and switchable to a first state to pass said current through one of said paths in response to one of said input levels and switchable to a second state to pass said current through the other of said paths in response to the other of said input levels, a potential supply, and resistive load impedance means connecting said potential supply and said switching device to pass said current between said potential supply and said device, said load impedance means and said potential supply presenting to said switching device a circuit having a first Thevenin equivalent voltage in said first state of the switching device and a second Thevenin equivalent voltage displaced from said first voltage in said state of the switching device.

7. A current switch comprising an input node adapted to receive a binary signal having either of two quiescent levels, a source of current, a pair of transistors each having a collector and an emitter, means connecting said node, supply and transistors to switch said current through one of said emitters in response to one of said input levels and through the other of said emitters in response to the other of said input levels, a potential supply, and resistive load impedance means connecting said potential supply and one of said collectors to pass said current between said supply and said one collector, said load impedance means presenting to said one collector a first load-line in response to one of said input levels and a second load-line in response to the other of said input levels, said first load-line being displaced a predetermined potential difference from said second load-line.

8. A current switch comprising an input node adapted to receive a binary signal having either of two quiescent levels, a source of current, a pair of transistors each having a collector and an emitter, means connecting said node, supply and transistors to switch said current through one of said emitters in response to one of said input levels and through the other of said emitters in response to the other of said input levels, a potential supply, and load impedance means connecting said potential supply and one of said collectors to pass said current between said supply and said one collector, said load impedance means and said potential source presenting to said one collector a circuit having a first Thevenin equivalent voltage in response to said one input level and a second Thevenin equivalent voltage displaced from said first voltage in response to said other input level.

9. A current switch comprising an input node adapted to receive a binary signal having either of two quiescent levels, a source of current, a pair of transistors each having a collector and an emitter, means connecting said node, supply and transistors to switch said current through one of said emitters in response to one of said input levels and through the other of said emitters in response to the other of said input levels, a potential supply, a pair of load impedance means each connecting said potential supply and a respective one of said collectors to pass said current between said potential supply and said collectors, and a third impedance means mutually connecting said two load impedance means to present to at least one of said transistors a variable load-line which is a function of the current flow therethrough.

10. A feedback current switch comprising a pair of transistors each having a base, collector and an emitter, an input node connected to the base of a first of said transistors, a current source connected to the emitters of both transistors, a potential supply, a pair of load resistors each connected between a respective one of the collectors and said potential supply, a direct-coupling between the collector of said first transistor and the base of the second transistor, and a resistor having opposite ends respectively connected to said collectors.

References Cited

UNITED STATES PATENTS

| | | | |
|---|---|---|---|
| 2,964,652 | 12/1960 | Yourke | 307—216 |
| 3,381,140 | 4/1968 | Walsh | 307—254 |

JOHN S. HEYMEN, Primary Examiner

D. M. CARTER, Assistant Examiner

U.S. Cl. X.R.

307—263, 268